United States Patent [19]

Gantenbrink

[11] 4,346,404
[45] Aug. 24, 1982

[54] MONITORING CAMERA

[76] Inventor: Rudolf Gantenbrink, Am Tiergarten 58, 3000 Hannover 73, Fed. Rep. of Germany

[21] Appl. No.: 209,288

[22] Filed: Nov. 21, 1980

[30] Foreign Application Priority Data

Nov. 28, 1979 [DE] Fed. Rep. of Germany ....... 2947864

[51] Int. Cl.³ .............................................. H04H 7/18
[52] U.S. Cl. .................................... 358/99; 358/100; 358/108; 358/229
[58] Field of Search .................. 358/99, 98, 100, 229, 358/108, 93; 354/64; 352/242, 243

[56] References Cited

U.S. PATENT DOCUMENTS 3,021,385  2/1962  Summerhayes, Jr. et al. ..... 358/100
3,021,386  2/1962  Clark ................................... 358/100

FOREIGN PATENT DOCUMENTS 2909895  9/1980  Fed. Rep. of Germany ........ 358/99
1556808  11/1979 United Kingdom ................ 358/108

Primary Examiner—Robert L. Richardson
Assistant Examiner—Edward L. Coles
Attorney, Agent, or Firm—Michael J. Striker

[57] ABSTRACT

A monitoring camera is installed in a wall of a submersible pressure vessel, such as a bathyscaphe. The camera includes a front portion having a front optic with a lens located at the interior of the vessel, and a rear portion. The lens sealingly covers the front portion and projects slightly into the interior of the vessel from its wall. A second lens spaced from the first lens is mounted in the front portion of the camera. These lenses are spaced from one another. A capillary channel is formed in the front portion, which channel extends from a space between the lenses toward outside the pressure vessel. The channel serves to permit helium eventually collected in said space to escape from the camera.

14 Claims, 1 Drawing Figure

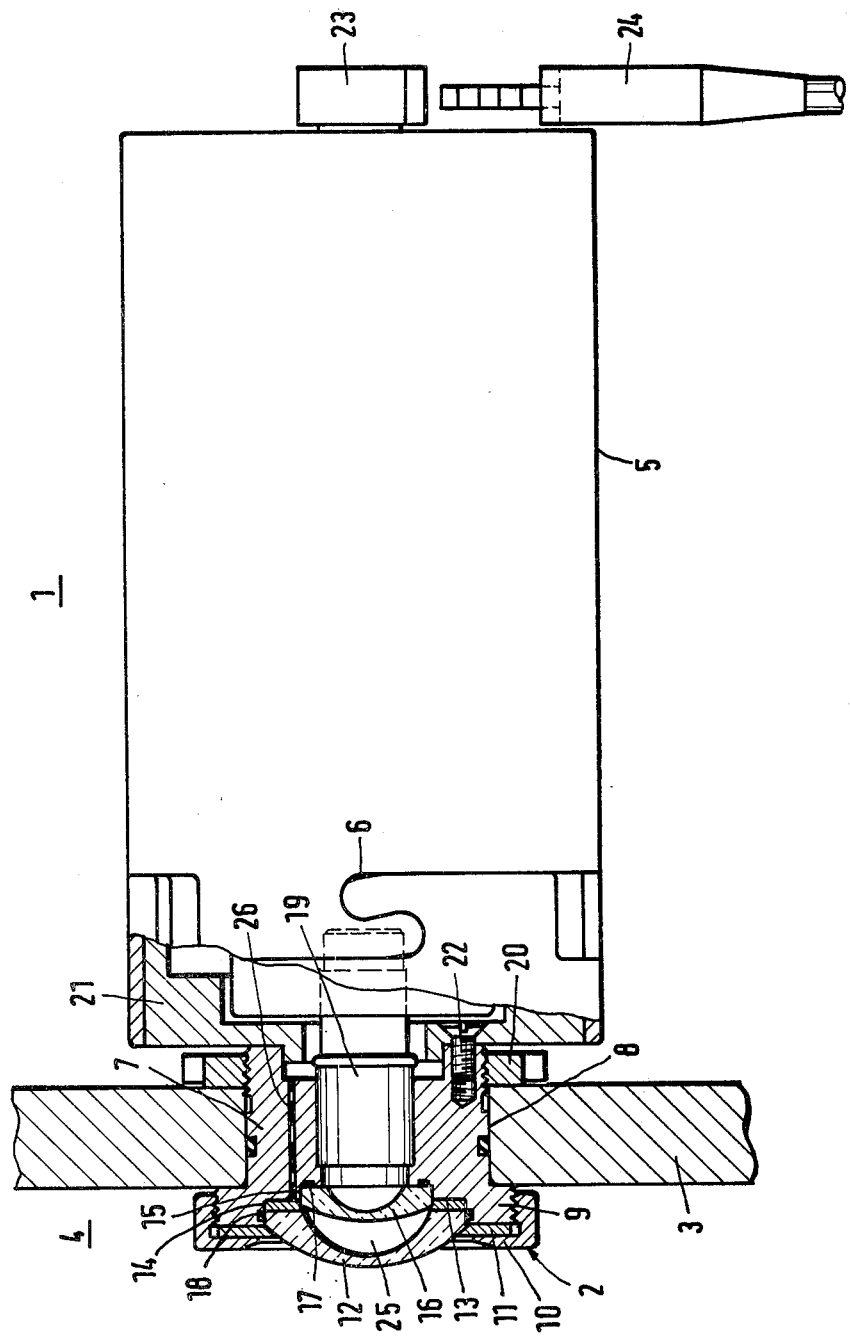

MONITORING CAMERA

BACKGROUND OF THE INVENTION

The present invention pertains to submersible pressure vessels, such as bathyscaphes, which may be used for deep-sea exploration. More particularly, the invention relates to a monitoring camera for such a pressure vessel.

The submersible pressure vessels adapted to operate under water and above water must be provided with means for controlling safety in the water environment. These controlling means usually comprise a television camera which supplies signals to a monitor installed within a monitoring station outside the pressure vessel.

It is known that monitoring cameras are mounted in the pressure vessels. Such installation is disadvantageous because a camera or a number of cameras being used usually restrict the volume in the pressure vessel. The pressure vessels of the foregoing type which operate in a deep-sea area are subjected to the occurence of oxygen-helium-air mixture within the pressure vessel, which mixture influences the amount of nitrogen in air in the vessel. This takes place particularly at a great depth under water.

When the pressure vessel is not reliably sealed against penetration of helium, the latter may be pressed inside the camera housing. During the decompression of the pressure vessel when the vessel emerges from a great depth, helium can not escape from the camera quickly. This leads to a pressure differential between the interior of the monitoring camera and the exterior thereof, which pressure differential may cause the explosure in the camera.

The known installations of monitoring cameras are used only when the camera is reliably sealed against helium. However, the cost of such sealing is considerably high.

In order to avoid the shortcomings encountered in the known installations, pressure vessels have been provided with port-holes extended from outside into the interior of the pressure vessel. This conventional installation permitted one to overcome the disadvantages relating to a space restriction within the vessel and to occurence of helium-air mixture in the vessel. However, this otherwise satisfactory installation was found disadvantageous. It has been recognized that a beam path of the camera installed outside the pressure vessel is limited by the port-hole because the walls of this port-hole act as a screen.

Furthermore, such installation is affected by a medium between the camera-objective-lenses and a glass of the port-hole. When the pressure vessel is located at the bottom of a sea the eye-piece of the optical system in the vessel may be eventually deteriorated by fine particles which occur at the bottom of a sea.

When the vessel operates above a water level air may be found between the camera and the port-hole. This fact leads to distortion of observation in the device since the port-hole does not have a sufficient light which happens frequently. In this case a picture to be viewed is reflected which causes the distortion of the optical image to be observed.

A further disadvantage of the outside installations of cameras is that changing of a camera is a time-consuming process because each new camera must be adjusted to a desirable portion of the pressure vessel.

These and other objects of the invention are attained by a monitoring camera for a submersible pressure vessel, particularly a bathyscaphe, which includes an interior and a wall surrounding the interior and having an inner side, the camera comprising a rear portion outside said pressure vessel and a front portion installed in an opening of said wall; and at least one lens located at the interior of said pressure vessel and sealingly covering said front portion, said lens projecting only slightly into said interior from said wall.

By the above-described assembling of the monitoring camera in the pressure vessel the aforementioned disadvantages of the conventional installations may be easily avoided.

The monitoring camera of the invention assures practically complete inspection in the pressure vessel because a dead angle of observation occured in the known devices is completely avoided.

By mounting of the monitoring camera in an opening of the wall of the vessel the adjustment of the monitoring camera is facilitated. When the camera is changed the new camera is easily adjusted.

According to the invention, the rear portion may be realisably-detachably connected to said front portion.

The front portion may include a cylindrical element extending through said opening.

The camera may include an optical system having two parts, said first part including said one lens and being accommodated in said front portion, said second part being accommodated in said rear portion of the camera.

The first portion of the optical system may be a front optic, said rear portion accommodating the remaining part of the camera. Said front optic may be a wide-angle optic. A wide-angle optic or lens is a closing part of the optical system which part is mounted in the front portion of the camera. By utilizing the wide-angle optic installed in the above-described fashion the camera does not restrict the volume inside the pressure vessel.

It is particularly advantageous that the rear portion of the camera is releasably-detachable connected to the front portion of the camera.

The rear portion of the camera may be connected to said front portion by a bayonett joint.

The mounting of the remaining part of the camera in the rear portion of the camera leads to the fact that easy changing of cameras is possible when desired.

The releasable connection of two portions of the camera is particularly advantageous under conditions when the pressure vessel operates above water for a long time, but the camera is under water. Under conditions of the operation above water a standard camera may be used as a front optic, which camera must be reliably protected against water splashes whereas for under water installations the front optic is connected to the camera positioned under water.

One or more lenses may be utilized in the camera. To overcome a pressure differential within the pressure vessel caused by destructions within the vessel two lenses are spaced from one another and sealed within the front portion of the camera.

The front portion may include at least one seal mounted in said cylindrical element to seal said one and second lenses and said space against a gas which may be penetrated into said space. Helium which may be collected in this space from oxygen-helium-ambient must be removed from this space in order to prevent the explosure which may occur during compression of the pressure vessel under water.

A capillary channel may be formed in the cylindrical element of the front portion, said channel extending from said space to outside the pressure vessel.

This channel may have an end which is open toward said rear portion.

Helium collected in said space may escape through the capillary channel without causing a substantial pressure drop in case the outer lense is accidentally destroyed.

The camera may further include an over pressure-operative valve mounted at said end.

The camera may also include a suction device connected to said channel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE illustrates a monitoring camera, partially in section, installed in a wall of a submersible pressure vessel.

DETAILED DESCRIPTION OF THE PREFERRED EMBODIMENT

Referring to the FIGURE, it may be seen that a monitoring camera generally denoted as 1 is mounted on a wall 3 of a submersible pressure vessel not illustrated herein. The camera 1 is composed of a front portion 2 and a remaining rear portion 5. A reference numeral 4 shows the interior of the pressure vessel. The front portion 2 is releasably connected to the portion 5 by means of a bayonet joint 6.

The front portion 2 of the camera includes a central cylindrical element 7 formed with a central opening 19. The element 7 is mounted in an opening 8 made in the wall 3 of the pressure vessel and extends somewhat into the interior 4 of the pressure vessel. The cylindrical element 7 is provided with a flange 9 which abuts against the inner side of the wall 3. The flange 9 has an outer thread by which it is threaded to a ring-shaped fastening element 10 which, respectively, has an inner thread. The fastening element 10 urges a first supporting ring 11 against the front side of the flange 9.

A first lens 12 is supported in a circular recess 14 formed in the cylindrical element 7, which lens is a part of an optical system utilized in the monitoring camera 1. The supporting ring 11 acts against the front end of the lens 12 thereby supporting the latter.

A second supporting ring 13 is inserted in the bottom of the recess 14 and serves to support the lens 12 at the other side thereof. A stepped recess 15 is formed in the cylindrical element 7 which has the diameters relatively smaller than that of the recess 14. A second lens 16 is positioned in the recess 15, which lens is partially engaged by the supporting ring 13. The lenses are sealed in the element 7 by O-ring seal 17 which is located in the wall formed by the recess 15. The seal 17 is pressed by the lens 16 against this wall. The first lens 12 is sealed by a O-ring seal 18 positioned in the recess 14.

The central opening 19 extending through the element 7 serves to accommodate a number of additional lenses utilized in the optical system if necessary.

The cylindrical element extends over the opening 8 towards the rear portion 5 of the camera 1. A portion 7a of the element 7 projecting from the wall 3 is provided with an outer thread. A supporting ring 20 is threaded to the portion 7a to secure the element 7 within the opening 8.

An anchoring member 21 is provided between the element 7 and the rear portion 5 of the camera. The member 21 is secured to the central element 7 by screws 22 and carries a half of the bayonett joint to be connected to the portion 5.

The remaining portion 5 of the camera releasably connected to the front portion 2 accommodates the commonly known camera. The front portion 2 carrying lenses 12 and 16 represents the front optic of the usual camera. The camera is, in usual fashion, provided with an output plug 23 for connecting the camera with a plug of a submerged cable.

As may be seen from the drawing, a space 25 is formed between the lenses 12 and 16. This space is sealed by O-ring seals 17 and 18. Because these O-rings can not prevent the penetration of helium which occurs under high pressure in the interior of the pressure vessel 4, helium penetrates into the space 25 between two lenses. During the decompression of the pressure vessel e.g. during emerging from a deep-sea area, helium collected in the space 25 may be exploded. In order to substantially reduce or avoid the danger of the explosive the device of the invention is provided with an open capillary channel 26 formed in the central element 7. This capillary channel is extended outside the pressure vessel to permit helium collected in the space 25 to escape outside the vessel, so that pressure in the space 25 is substantially reduced.

An overpressure valve may be connected to the outer open end of the capillary channel 26, which valve operates even under relatively small overpressure. A suction device may be also connected the open end of channel 26. A reference numeral 30 may denote either the overpressure valve or the suction device.

The above-described device is easy to assemble; it is composed of simple elements and not subjected to malfunction. This device overcomes the disadvantages of the known constructions by very simple means.

It will be understood that each of the elements described above, or two or more together, may also find a useful application in other types of monitoring camera differing from the types described above.

While the invention has been illustrated and described as embodied in a monitoring camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A monitoring camera for a submersible pressure vessel, particularly a bathyscaphe, which includes an interior and a wall surrounding the interior and having an inner side, the camera comprising a rear portion outside said pressure vessel and a front portion installed in an opening of said wall; and at least one lens located at the interior of said pressure vessel and sealingly covering said front portion, said lens projecting only slightly into said interior from said wall.

2. The camera of claim 1, wherein said rear portion is detachably connected to said front portion.

3. The camera of claim 2, wherein said front portion includes a cylindrical element extending through said opening.

4. The camera of claim 3, further including an optical system, having two parts, said first part including said one lens and being accommodated in said front portion, said second part being accommodated in said rear portion of the camera.

5. The camera of claim 4, wherein said first portion of said optical system is a front optic of a standard camera, said rear portion accommodating the remaining part of the camera.

6. The camera of claim 4, wherein said front optic is a wide-angle optic.

7. The camera of claim 6, wherein said rear portion is connected to said front portion by a bayonett joint.

8. The camera of claim 7, further including a second lens mounted in said cylindrical element.

9. The camera of claim 8, wherein said second lens being spaced from said one lens to define a space therebetween.

10. The camera of claim 9, further including a least one seal mounted in said cylindrical element to seal said one and second lenses and said space against a gas which may be penetrated into said space.

11. The camera of claim 1, wherein a capillary channel is formed in said cylindrical element, said channel extending from said space to outside of the pressure vessel.

12. The camera of claim 11, wherein said channel has an end which is toward said rear portion.

13. The camera of claim 12, further including an overpressure-operative valve connected to said end.

14. The camera of claim 12, further including a suction device mounted connected to said channel.

* * * * *